(12) United States Patent
Winkler et al.

(10) Patent No.: US 9,599,965 B2
(45) Date of Patent: Mar. 21, 2017

(54) PROCESS FOR ADJUSTING THE RELATIVE POSITION OF A FIRST AND A SECOND PIECE OF A MECHANICAL ASSEMBLY

(75) Inventors: Yves Winkler, Schmitten (CH); Stewes Bourban, Cudrefin (CH); Alban Dubach, Bienne (CH)

(73) Assignee: The Swatch Group Research and Development Ltd, Marin (CH)

( * ) Notice: Subject to any disclaimer, the term of this patent is extended or adjusted under 35 U.S.C. 154(b) by 476 days.

(21) Appl. No.: 13/703,811

(22) PCT Filed: Jun. 22, 2011

(86) PCT No.: PCT/EP2011/060404
§ 371 (c)(1),
(2), (4) Date: Feb. 26, 2013

(87) PCT Pub. No.: WO2011/161138
PCT Pub. Date: Dec. 29, 2011

(65) Prior Publication Data
US 2013/0145811 A1 Jun. 13, 2013

(30) Foreign Application Priority Data

Jun. 22, 2010 (CH) ........................................ 1020/10
Jun. 22, 2010 (CH) ........................................ 1022/10

(51) Int. Cl.
*G04D 3/00* (2006.01)
*G04B 13/02* (2006.01)
(Continued)

(52) U.S. Cl.
CPC ............ *G04D 3/0074* (2013.01); *B21D 39/00* (2013.01); *B23P 6/00* (2013.01); *G04B 13/022* (2013.01); *G04B 15/14* (2013.01); *G04D 3/00* (2013.01)

(58) Field of Classification Search
CPC ........ G04B 13/022; G04B 15/14; G04D 3/00; G04D 3/0074; B23P 6/00; B21D 39/00
(Continued)

(56) References Cited

U.S. PATENT DOCUMENTS 581,535 A * 4/1897 Church .................. G04B 15/08
368/133
2,685,165 A * 8/1954 Andre Accola ............... 368/125
(Continued)

FOREIGN PATENT DOCUMENTS

| EP | 2 138 323 | 12/2009 |
| EP | 2 180 385 | 4/2010 |
| EP | 2 317 406 | 5/2011 |

OTHER PUBLICATIONS

International Search Report Issued Nov. 23, 2011 in PCT/EP11/060404 Filed Jun. 22, 2011.

*Primary Examiner* — Sean Kayes
(74) *Attorney, Agent, or Firm* — Oblon, McClelland, Maier & Neustadt, L.L.P.

(57) ABSTRACT

A process for adjusting a device including a first piece and at least one second piece, wherein the at least one second piece is fixed to the first piece by a joint made from a first material arranged between the first and second piece. The first material is an at least partially amorphous metal alloy. The process further includes: heating at least the joint to a heating temperature in a range of between a glass transition temperature and a crystallization temperature of the first material; modifying a position of the at least one second piece until a desired determined position is obtained; cooling at least the joint so that it retains its at least partially amorphous state.

22 Claims, 2 Drawing Sheets

(51) Int. Cl.
*G04B 15/14* (2006.01)
*B23P 6/00* (2006.01)
*B21D 39/00* (2006.01)

(58) Field of Classification Search
USPC .......................................................... 29/896.3
See application file for complete search history.

(56) References Cited

U.S. PATENT DOCUMENTS

| | | | |
|---|---|---|---|
| 5,826,102 A * | 10/1998 | Escobar | G06F 17/30017 707/E17.009 |
| 5,928,453 A * | 7/1999 | Kawamoto | B29C 65/1412 156/272.2 |
| 6,843,594 B1 * | 1/2005 | Moteki et al. | 368/140 |
| 7,527,425 B2 * | 5/2009 | Born | G04B 15/14 368/129 |
| 2001/0030908 A1 * | 10/2001 | Moteki et al. | 368/140 |
| 2005/0091820 A1 * | 5/2005 | Wu | B23K 1/0008 29/428 |
| 2007/0133355 A1 * | 6/2007 | Hara et al. | 368/140 |
| 2008/0101162 A1 * | 5/2008 | Born | 368/132 |
| 2009/0196125 A1 | 8/2009 | Tsuchiya et al. | |
| 2011/0051573 A1 | 3/2011 | Tsuchiya et al. | |
| 2011/0103199 A1 | 5/2011 | Winkler et al. | |
| 2011/0103200 A1 | 5/2011 | Cusin | |
| 2012/0024432 A1 * | 2/2012 | Bazin et al. | 148/522 |

\* cited by examiner

PROCESS FOR ADJUSTING THE RELATIVE POSITION OF A FIRST AND A SECOND PIECE OF A MECHANICAL ASSEMBLY

CROSS-REFERENCE TO RELATED APPLICATIONS

This is a National Phase Application in the United States of International Patent Application PCT/EP2011/060404 filed Jun. 22, 2011, which claims priority on Swiss Patent Application No. 01022/10 of Jun. 22, 2010 and Swiss Patent Application No. 01020/10 of Jun. 22, 2010. The entire disclosures of the above patent applications are hereby incorporated by reference.

The present invention relates to a process for adjusting a device. The device comprises a first piece and at least one second piece, wherein said at least one second piece is fixed to the first piece by means of a joint arranged between said first and second pieces.

The technical field of the invention is the field of mechanics.

TECHNOLOGICAL BACKGROUND

There are numerous devices that after production require a step of adjustment in order to be perfectly compliant. This need for high precision exists in fields of microtechnology such as watchmaking, for example. In fact, the world of watchmaking works with dimensions from the millimeter to hundredth of a millimeter range. Examples of devices where precision is important include wheel trains or also the escapement. In actual fact, the escapement is formed from an anchor and an escape wheel cooperating with one another. The rotation of the latter is controlled by the anchor of the escapement system, the pulses of which are supplied by a spring balance. Thus, the escapement system comprises an anchor mounted to pivot on an axis. This anchor comprises a lever fitted on a first end with a fork intended to cooperate with a pin mounted on a disc and fitted on a second end with arms intended to receive pallets in order to cooperate with the escape wheel. During its operation the anchor pivots on its axis in such a manner that the pallets of the arms come into contact with the teeth of the escape wheel in order to control the rotation of the wheel trains. Now, if the pallets of the anchor are not positioned properly, the pulses between the pallets of the anchor and the escape wheel are not perfect and losses occur, thus affecting the efficiency of the escapement and therefore the precision of the watch. Currently, the assembly of the pallets on an anchor is achieved using a gum lacquer, which is a natural product with properties similar to those of thermoplastic materials. These properties allow the pallets to be repositioned relative to the anchor by locally heating the anchor. However, the quality of gum lacquer fluctuates greatly from one batch to another, which makes repositioning a delicate operation. Moreover, since the viscosity of gum lacquer is difficult to control and as it is difficult to control the volume of glue deposited, an overflow of the gum often occurs, which results in possibly unacceptable aesthetic flaws. Moreover, since gum lacquer is an organic material, it is subject to aging and consequently the fixture of the pallet can be weakened.

Another possibility would be to use brazing or soldering. However, these two solutions are also problematic, since to have any chance of soldering a ceramic or silicon or mineral material, it is necessary to use reactive brazing/soldering, which must be conducted at a relatively high temperature (generally above 700° C.) and in a neutral atmosphere or in high vacuum. This results in very long assembly cycles and risks of breakage/cracking of the material are possible.

SUMMARY OF THE INVENTION

The aim of the invention is to overcome the disadvantages of the prior art by proposing to provide a simple, reliable and precise adjustment process.

For this purpose, the invention relates to the aforementioned adjustment process, which is characterised in that the first material is an at least partially amorphous metal alloy, and in that said process additionally comprises the following steps:

heating at least said joint to a heating temperature in the range of between the glass transition temperature and the crystallisation temperature of the first material;

modifying the position of said at least one second piece until the desired determined position is obtained;

cooling at least said joint so that it retains its at least partially amorphous state.

A first advantage of the present invention is to enable a controlled adjustment of the position of the second piece in relation to the first piece. In fact, at least partially amorphous materials such as amorphous metals have the ability to soften significantly when they are heated to a temperature in the range of between their glass transition temperature and their crystallisation temperature. In this temperature range, amorphous metals have a viscosity that decreases significantly, wherein the decrease in viscosity is dependent on the temperature: the higher the temperature, the greater the decrease in viscosity. This decreasing viscosity thus allows the fixture to be loosened in such a way that the second piece can be displaced to modify its position and give it a desired precise position. The viscosity can then be adjusted so as to simplify said adjustment process.

Another advantage of this process is that it is reproducible in the sense that once the amorphous metal is cooled to be solid, it is possible to reheat it to a temperature in the range of between its glass transition temperature and its crystallisation temperature to modify the position of the second piece in relation to the first if this was not perfect.

Advantageous embodiments of this process are the subject of the dependent claims.

In a first advantageous embodiment said first material is completely amorphous.

In a second advantageous embodiment said metal alloy comprises at least one precious metal element selected from the group formed by gold, platinum, palladium, rhenium, ruthenium, rhodium, silver, iridium or osmium.

In a third advantageous embodiment, in the heating step the heating temperature is selected to obtain a determined viscosity of the first material.

In another advantageous embodiment the process additionally comprises a step of crystallisation of said first material consisting of heating said first material to a temperature in the range of between its glass transition temperature and its melting temperature, holding said material at this temperature for a certain period and cooling it.

In another advantageous embodiment the temperature and holding time of said first material is selected in order to reach a determined crystallisation rate.

In another advantageous embodiment the joint and the first piece only form a single piece made from the first material.

In another advantageous embodiment the first piece is an anchor and the at least one second piece is a pallet.

One of the advantages of these embodiments is to allow the adjustment to hold by crystallising the amorphous metal joint. In fact, crystallising an amorphous material takes away its ability to be changed into a viscous state by heating it to a temperature in the range of between its glass transition temperature and its crystallisation temperature. Thus, returning the joint to amorphous form requires changing it into liquid form and rapidly cooling it, and thus destroying the device.

The invention also proposes to provide a device comprising a first piece and at least one second piece, wherein said at least one second piece is fixed to the first piece by means of a joint arranged between said first and second pieces. Said device is characterised in that said joint is made from an at least partially amorphous metal alloy.

BRIEF DESCRIPTION OF THE FIGURES

The aims, advantages and characteristics of the process according to the present invention will become clearer from the following detailed description of at least one embodiment of the invention given solely as a non-restrictive example and illustrated in the attached drawings, wherein.

DETAILED DESCRIPTION

Figure 1:
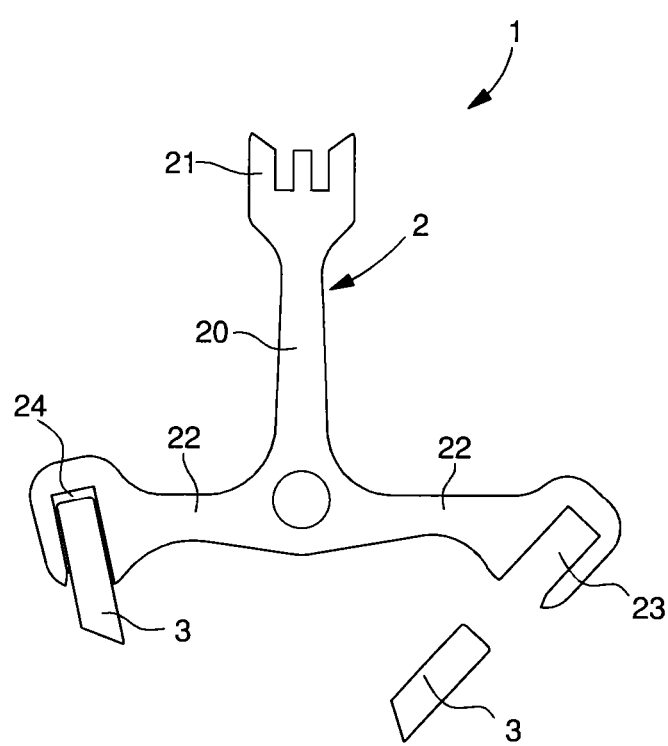
FIG. 1 schematically shows an anchor before the production process.
Figure 2:
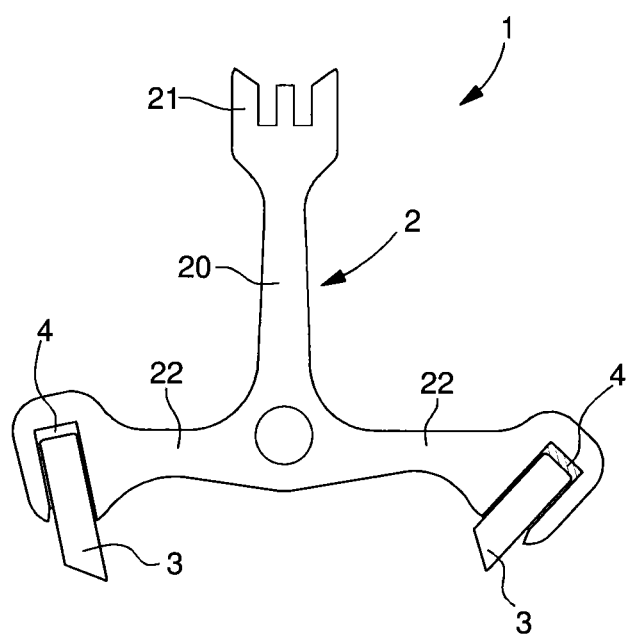
FIG. 2 schematically shows an anchor at the end of the production process.

FIGS. 1 and 2 show a device 1 comprising a first piece 2 and at least one second piece 3. This device 1 can be a part of an escapement of a timepiece, for example. This escapement 1 is formed from an anchor and an escape wheel that cooperate with one another. The rotation of the latter is adjusted by the anchor of the escapement system, the pulses of which are supplied by a spring balance. Thus, the escapement system comprises an anchor mounted to pivot on an axis. This anchor 2 represents the first piece and is provided in the form of a lever 20 fitted on a first end with a fork 21 intended to cooperate with a pin mounted on a disc and fitted on a second end with at least two arms 22. This anchor 2 is intended to receive at least one second piece 3, i.e. pallets, in order to cooperate with the escape wheel. During its operation the anchor 2 pivots on its axis in such a manner that the pallets 3 come into contact with the teeth of the escape wheel in order to control the rotation of the wheel trains.

The pallets 3 are fixed to the lever 20 of the anchor 2 at seats 23 arranged on each of the two arms 22. These seats 23 have dimensions calculated to allow for an interstice or space 24 to be created between said arm 22 and said pallet 3 when the latter is inserted into the seat 23. This interstice 24 is used so that a joint 4 made of a first material can be arranged between said arm 22 of the anchor 2 and said pallet 3.

In a first embodiment of the present invention the joint 4 is made of a first material, which is an at least partially amorphous material comprising at least one metallic element. This first material can be an at least partially amorphous metal alloy. This metallic element can be a precious metal element such as gold, platinum, palladium, rhenium, ruthenium, rhodium, silver, iridium or osmium. An at least partially amorphous material is understood to be a material that is able to solidify at least partially in amorphous phase. Said first material is preferably completely amorphous.

The assembly of the pallets 3 on the anchor 2 by means of the joint 4 precedes this adjustment step and can be achieved by different methods.

The property of amorphous materials that allows these to have a viscosity that decreases considerably in a given temperature range for each material while remaining amorphous is made use of to modify the position of the pallets 3 of the anchor 2.

The first step of this adjustment process consists of providing said anchor 1, to which the pallets 3 are fixed.

The second step consists of increasing the temperature of at least one part of the anchor 1. Advantageously, the joints 4 are subjected to said increase in temperature. In fact, the joints 4 hold the pallets 3 fixed to the anchor 2 and an adjustment is made possible by acting on these joint 4. The joints 4 are heated to a temperature in the range of between the glass transition temperature Tg and the crystallisation temperature Tx of the first material. This increase in temperature results in a decrease in viscosity of the first material forming the joints 4.

Figure 3:
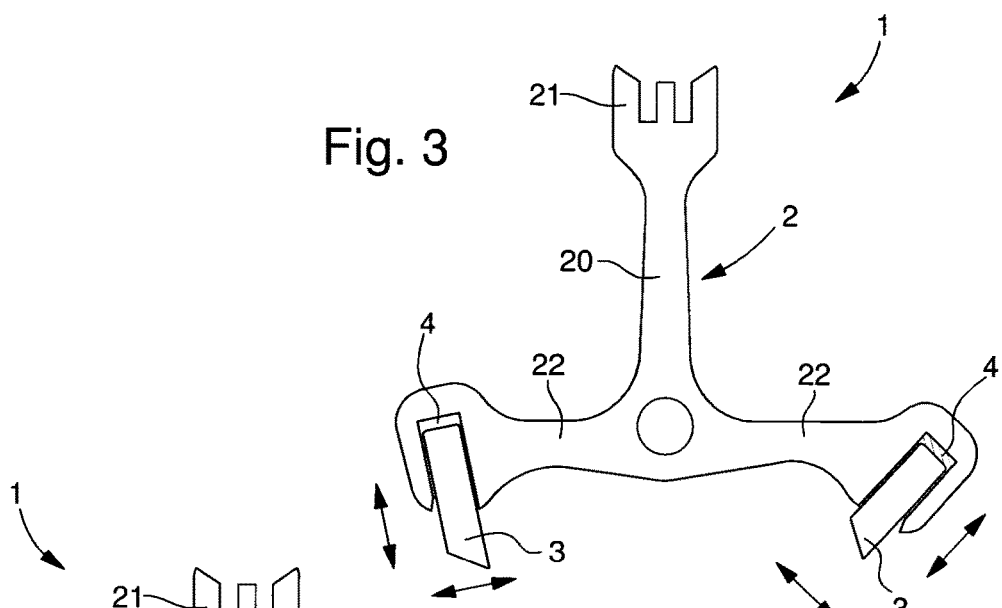
FIG. 3 schematically shows an anchor during the adjustment process according to the present invention.

The third step consists of displacing at least one of the pallets 3 to place it in a desired position as visible in FIG. 3. This displacement is possible because the first material is an amorphous metal alloy with a very low viscosity when it is heated to a temperature in the range of between its glass transition temperature Tg and its crystallisation temperature Tx. This low viscosity enables the pallet or pallets 3 to be displaced without deterioration or breakage of the joint or joints 4. To optimise the procedure it would be possible to adapt the temperature at which the joints 4 are heated to obtain a determined viscosity. In fact, the viscosity is dependent on the temperature, i.e. the higher the temperature, the lower the viscosity will be and vice versa. Now, if the viscosity is too low, the displacements of the pallet 3 will be difficult because the pallet or pallets 3 will be displaced too easily and therefore there will be a loss of precision in the adjustment. In contrast, if the viscosity is too high, more force must be applied to displace the pallet or pallets 3 and risks of breakage can arise.

Figure 4:
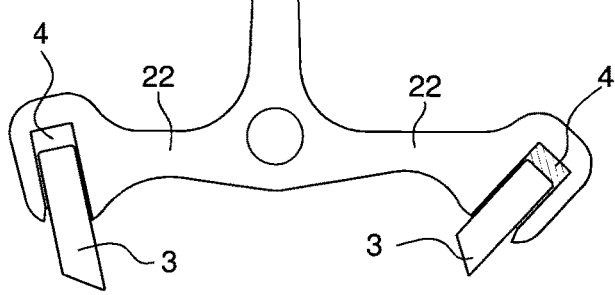
FIG. 4 schematically shows an anchor after having undergone the adjustment process according to the present invention.

Once the pallets 3 are placed in the desired position, a fourth step consists of cooling the joints 4 of amorphous metal so that they remain at least partially amorphous and hold the position of said pallets 3 as in FIG. 4. The advantage of said process is thus to prevent any degassing of the material while assuring a very high strength of the fixture of the pallet at the anchor 2. The advantage is that the joints 4 are always in an amorphous state, which allows the position of the pallets 3 to be modified once again as required.

In a first variant there is provided an additional or fifth step, in which the amorphous metal joints 4 are crystallised. This crystallisation is conducted by heating these joints 4 to a temperature in the range of between the glass transition temperature Tg and the crystallisation temperature Tx of the material forming the joints. The first material is then cooled slowly to allow the atoms to arrange themselves in a crystalline structure. This crystallisation enables the position of the pallets to be held since after this crystallisation step it is no longer possible to modify the position of pallets 3 by heating the joints 4 between the glass transition temperature Tg and the crystallisation temperature Tx of the material.

Moreover, this crystallisation can in some cases cause an increase in volume of the material, which changes from an amorphous state to a crystallised state. The consequence of this increase in volume is an increase in stress applied by said joints 4 on said anchor 2 and on the pallets 3. These pallets 3 are thus held under force and there is therefore no risk of them being displaced in the event of impacts with the teeth of the escape wheel.

Figure 5:
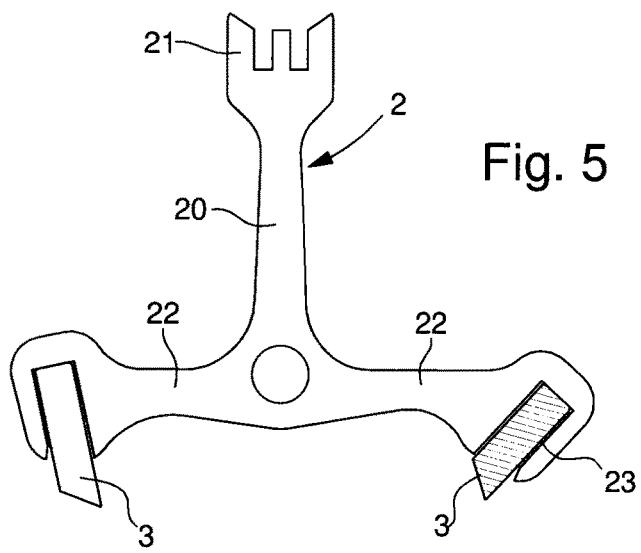
FIG. 5 schematically shows a variant of the anchor undergoing the adjustment process according to the present invention.

In a second embodiment of the present invention shown in FIG. 5, the joint 4 and the anchor 2 form only one single piece. It is thus understood that the anchor 2 is made of the said first material and therefore of an amorphous metal. The anchor 2 thus acts as joint 4.

The anchor 2 can be made by hot or cold forming. The anchor 2 is thus formed at the same time as the pallets 3 are fixed to said anchor 2.

Once the anchor 2 has been formed, it is possible to adjust the position of the pallets 3 if these are not placed correctly.

The first step of this adjustment process therefore consists of providing said anchor 2, to which the pallets 3 are fixed.

The second step consists of increasing the temperature of at least one zone of the anchor 2. The increase in temperature must be conducted locally at the fixture zones between the first piece 2 and the second piece 3. In the case of an anchor 2, these zones are the zones of the seats of the arms 22 where the pallets 3 are inserted. These zones are heated to a temperature in the range of between the glass transition temperature Tg and the crystallisation temperature Tx of the amorphous metal. This temperature increase causes a decrease in the viscosity of the amorphous metal without this losing its amorphous state.

The third step is similar to the third step of the first embodiment and thus consists of the displacement in three axes: length, width and height, of at least one of the pallets 3 to place it in a desired position. To optimise the procedure it would be possible to adapt the temperature at which the joints 4 are heated to obtain a desired viscosity.

Once the pallets 3 are placed in the desired position, a fourth step consists of cooling the amorphous metal zones so that they remain at least partially amorphous and hold the position of said pallets 3. The advantage of said process is thus to prevent any degassing of the material while assuring a very high strength of the fixture of the pallet at the anchor.

It is understood that this adjustment process can be conducted once again if the adjustments performed are not yet perfect or in the case of a later modification of the position of the pallets 3.

A fifth optional step can be performed. This step consists of an at least partial crystallisation of the zones at the level where the pallets 3 are fixed. This step is performed by increasing the temperature of the zones at the level where the pallets 3 are fixed. The temperature is increased to reach a temperature in the range of between the glass transition temperature Tg and the crystallisation or temperature Tx or melting temperature of the amorphous metal. The latter decreases in viscosity while remaining amorphous. These heated zones are then held at this temperature and are then cooled slowly so that they form a crystalline structure. The cooling temperature and period and the holding time of the metal at this temperature are parameters that allow the crystallisation rate to be fixed. This crystallisation is used to hold adjustments made beforehand. In fact, when a material is in crystalline form, it cannot undergo the adjustment process according to the invention. The only way would be to change it to amorphous form, i.e. to heat it to above its melting temperature to make said material liquid and then cool it rapidly to below its glass transition temperature so that it is amorphous. Now, with respect to a joint 4 between a pallet 3 and an anchor 2, the melting of the joint causes at least a deterioration in the joint 4 or even destruction of the device 1, making an adjustment impossible.

In a variant of this second embodiment it can be provided that the pallets 3 are also made from amorphous metal. The amorphous metal used for the pallets 3 will preferably be different from that used for the anchor 2 so that when the amorphous metal of the anchor 2 is heated to reach a temperature in the range of between its glass transition temperature Tg and its crystallisation temperature Tx, the amorphous metal of the pallets does not become viscous like the amorphous metal of said anchor 2.

It will be understood that various modifications and/or improvements and/or combinations evident to the person skilled in the art can be applied to the different embodiments of the invention discussed above without departing from the framework of the invention defined by the attached claims.

It is naturally understood that this adjustment process is not restricted to the adjustment of the position of the pallets 3 and an anchor 2. This process can be used with respect to other devices. The devices using this adjustment process are, for example, a device comprising a wheel driven onto an axis, wherein said device comprises a joint positioned between said axis and said wheel. The position of the wheel can then be adjusted by applying the adjustment process to said joint. Adjustment can be performed along the axis or angularly.

The invention claimed is:

1. A process for adjusting a timepiece device comprising a first piece and at least one second piece, comprising:
   fixing said at least one second piece to the first piece by a joint made from a first material arranged between said first and second pieces, said joint being a separate part from said first and second pieces, the first piece including at least one seat for said at least one second piece, and the joint being arranged inside the at least one seat, wherein said first material is an at least partially amorphous metal alloy;
   heating at least said joint to a heating temperature in a range of between a glass transition temperature and a crystallization temperature of the first material, wherein the at least one seat in the first piece is already formed and the at least one second piece is already fixed to the first piece by the joint arranged inside the at least one seat before the heating of the at least partially amorphous metal alloy of the joint;
   modifying a position of said at least one second piece until a desired determined position is obtained; and
   cooling at least said joint so that said joint retains its at least partially amorphous state.

2. The process according to claim 1, wherein during the heating the first material of the joint decreases in viscosity and retains an at least partially amorphous state.

3. The process according to claim 1, wherein the at least one seat includes dimensions so that an interstice exists between said first piece and said at least one second piece when said at least one second piece is inserted into the at least one seat.

4. The process according to claim 1, wherein said first material is completely amorphous.

5. The process according to claim 4, wherein said metal alloy comprises at least one precious metal element selected from the group formed by gold, platinum, palladium, rhenium, ruthenium, rhodium, silver, iridium or osmium.

6. The process according to claim 1, wherein said metal alloy comprises at least one precious metal element selected from the group formed by gold, platinum, palladium, rhenium, ruthenium, rhodium, silver, iridium or osmium.

7. The process according to claim 1, wherein in the heating the heating temperature is selected to obtain a determined viscosity of the first material.

8. The process according to claim 1, further comprising crystallizing said first material by heating said first material to a temperature in a range of between said glass transition temperature and its melting temperature, holding said first material at said temperature for a holding time period and cooling said first material.

9. The process according to claim 8, wherein the temperature and holding time period of said first material is selected in order to reach a determined crystallization rate.

10. The process according to claim 1, wherein the first piece is an anchor and the at least one second piece is a pallet.

11. A timepiece device comprising a first piece and at least one second piece, wherein said at least one second piece is fixed to the first piece by a joint arranged between said first and second pieces, said joint being a separate part from said first and second pieces, the first piece includes at least one seat for said at least one second piece, and the joint is arranged inside the at least one seat, wherein said joint is made from an at least partially amorphous metal alloy, wherein the at least one seat includes dimensions so that the at least partially amorphous metal alloy is arranged in an interstice that exists between said first piece and said at least one second piece, and wherein the position of the at least one second piece in relation to the first piece is adjusted using the process according to claim 1.

12. The timepiece device according to claim 11, wherein the first piece is an anchor and the at least one second piece is a pallet.

13. A process for adjusting a timepiece device comprising a first piece and at least one second piece, wherein said at least one second piece is fixed to the first piece by a joint made from a first material arranged between said first and second pieces, wherein said first material is an at least partially amorphous metal alloy, the joint and the first piece only forming a single piece made from the first material, the first piece including at least one seat for said at least one second piece, and the joint forms the at least one seat, and wherein said process comprises:
  heating at least said joint to a heating temperature in the range of between a glass transition temperature and a crystallization temperature of the first material, wherein the at least one seat in the first piece is already formed and the at least one second piece is already fixed to the first piece by the joint that forms the at least one seat before the heating of the at least partially amorphous metal alloy of the joint;
  modifying a position of said at least one second piece until a desired determined position is obtained; and
  cooling at least said joint so that said joint retains its at least partially amorphous state.

14. The process according to claim 13, wherein said first material is completely amorphous.

15. The process according to claim 14, wherein said metal alloy comprises at least one precious metal element selected from the group formed by gold, platinum, palladium, rhenium, ruthenium, rhodium, silver, iridium or osmium.

16. The process according to claim 13, wherein said metal alloy comprises at least one precious metal element selected from the group formed by gold, platinum, palladium, rhenium, ruthenium, rhodium, silver, iridium or osmium.

17. The process according to claim 13, wherein in the heating the heating temperature is selected to obtain a determined viscosity of the first material.

18. The process according to claim 13, further comprising crystallizing said first material by heating said first material to a temperature in the range of between said glass transition temperature and its melting temperature, holding said material at said temperature for a holding time period and cooling said first material.

19. The process according to claim 18, wherein the temperature and holding time of said first material is selected in order to reach a determined crystallization rate.

20. The process according to claim 13, wherein the first piece is an anchor and the at least one second piece is a pallet.

21. A timepiece device comprising a first piece and at least one second piece, wherein said at least one second piece is fixed to the first piece by a joint arranged between said first and second pieces, the joint and the first piece only forming a single piece made from the first material, the first piece includes at least one seat for said at least one second piece, and the joint forms the at least one seat, wherein said joint is made from an at least partially amorphous metal alloy, wherein only the at least one second piece is inside the at least one seat that is made of the at least partially amorphous metal alloy, and wherein the position of the at least one second piece in relation to the first piece is adjusted using the process according to claim 13.

22. The timepiece device according to claim 21, wherein the first piece is an anchor and the at least one second piece is a pallet.

* * * * *